(12) United States Patent
Cheng et al.

(10) Patent No.: US 12,481,879 B2
(45) Date of Patent: Nov. 25, 2025

(54) VIRTUAL METROLOGY METHOD BASED ON CONVOLUTIONAL AUTOENCODER AND TRANSFER LEARNING AND SYSTEM THEREOF

(71) Applicant: NATIONAL CHENG KUNG UNIVERSITY, Tainan (TW)

(72) Inventors: Fan-Tien Cheng, Tainan (TW); Yu-Ming Hsieh, Kaohsiung (TW); Yueh-Feng Tsai, Yunlin County (TW); Chin-Yi Lin, Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 573 days.

(21) Appl. No.: 18/063,661

(22) Filed: Dec. 8, 2022

(65) Prior Publication Data

US 2023/0419107 A1 Dec. 28, 2023

(30) Foreign Application Priority Data

Jun. 22, 2022 (TW) ................................ 111123260

(51) Int. Cl.
*G06N 3/08* (2023.01)
(52) U.S. Cl.
CPC ..................... *G06N 3/08* (2013.01)
(58) Field of Classification Search
CPC ........ G06N 3/08; G06N 3/0464; G06N 3/096; G06N 3/0455; G06N 20/00; H01L 22/12
See application file for complete search history.

(56) References Cited

U.S. PATENT DOCUMENTS

| | | | |
|---|---|---|---|
| 8,095,484 B2 | 1/2012 | Cheng et al. | |
| 2023/0259112 A1* | 8/2023 | Cheon | G05B 23/0254 |
| 2023/0317528 A1* | 10/2023 | Olmos | G03F 7/7065 |
| | | | 438/504 |
| 2023/0400847 A1* | 12/2023 | Guo | G05B 23/0283 |
| 2024/0096713 A1* | 3/2024 | Zhang | H01L 21/67253 |

OTHER PUBLICATIONS

Yu-Ming Hsieh et al., "Convolutional Autoencoder and Transfer Learning for Automatic Virtual Metrology," in IEEE Robotics and Automation Letters, Jul. 2021.
Yu-Ming Hsieh et al., "Convolutional Neural Networks for Automatic Virtual Metrology," in IEEE Robotics and Automation Letters, vol. 6, No. 3, pp. 5720-5727, Jul. 2021.

* cited by examiner

*Primary Examiner* — Mong-Shune Chung
(74) *Attorney, Agent, or Firm* — CKC & Partners Co., LLC

(57) ABSTRACT

A virtual metrology method based on convolutional autoencoder and transfer learning includes performing a data alignment operation, a modeling operation and a calculating operation. The data alignment operation includes performing a data-length adjusting operation onto a plurality of sets of process data. The modeling operation includes classifying paired data and unpaired process data; creating a pre-trained model by using the unpaired process data, and then inputting the paired data to the pre-trained model to create a virtual metrology model based on convolutional autoencoder. The virtual metrology model based on convolutional autoencoder includes at least one convolutional neural network model. In addition, the calculating operation includes executing one of a predicting step and a transfer learning step according to whether the actual metrology data is obtained, thereby calculating one of a phase-one virtual metrology value and a phase-two virtual metrology value.

20 Claims, 10 Drawing Sheets

VIRTUAL METROLOGY METHOD BASED ON CONVOLUTIONAL AUTOENCODER AND TRANSFER LEARNING AND SYSTEM THEREOF

RELATED APPLICATIONS

This application claims priority to Taiwan Application Serial Number 111123260, filed Jun. 22, 2022, which is herein incorporated by reference.

BACKGROUND

Field of Invention

The present invention relates to a virtual metrology method and a system thereof. More particularly, the present invention relates to a virtual metrology method based on convolutional autoencoder and transfer learning and a system thereof.

Description of Related Art

To ensure stable processing and high-yield production, high-tech factories (e.g., semiconductor, TFT-LCD) demand product quality total inspection. General speaking, sampling inspection only measures a few samples and comes with metrology delay, thus it cannot achieve the goal of real-time and online total inspection. Automatic virtual metrology (AVM) was developed to tackle such problem. It can collect the data from the process tools to conjecture the virtual metrology (VM) values in the prediction model for realizing the goal of online and real-time total inspection. With the advancement of technology, the processes become more and more precise, and better accuracy of VM value prediction is demanded. The convolutional neural network-based (CNN-based) AVM (denoted as $AVM_{CNN}$) scheme can not only enhance the accuracy of the original AVM prediction, but also perform better on the extreme values. Nevertheless, two advanced capabilities need to be addressed for its practical applications: 1) effective initial-model-creation approach with insufficient metrology data; and 2) intelligent self-learning capability for on-line model refreshing. Therefore, a virtual metrology method based on convolutional autoencoder and transfer learning and a system thereof which are capable of performing effective initial-model-creation approach with insufficient metrology data and having intelligent self-learning capability for on-line model refreshing to maintain the prediction accuracy are commercially desirable.

SUMMARY

An object of the present invention is to provide a virtual metrology method based on convolutional autoencoder and transfer learning and a system thereof. The virtual metrology method of the present disclosure integrates convolutional autoencoder with transfer learning to perform the modeling and prediction, thereby solving a problem of a conventional deep learning-based algorithm that needs to collect large amounts of paired data for modeling. In addition, the present disclosure can build a dual-phase scheme based on transfer learning via different learning strategies and have intelligent self-learning capability for on-line model refreshing to maintain the prediction accuracy, thus facilitating AVM to have wider application in the more and more sophisticated semiconductor industry.

According to an aspect of the present disclosure, a virtual metrology method based on convolutional autoencoder and transfer learning includes a plurality of steps. A first one of the steps includes obtaining a plurality of sets of process data. The sets of process data are used or generated by a production tool when a plurality of workpieces are processed by the production tool, and the sets of process data are one-to-one corresponding to the workpieces. Each of the sets of process data includes values of a plurality of parameters, and the values of each of the parameters are respectively corresponding to a plurality of sets of time series data of the workpieces. Each of the sets of time series data has a data length. A second one of the steps includes performing a data alignment operation onto the sets of process data. The data alignment operation includes performing a data-length adjusting operation to repeat adding at least one data point having a value of an end data point of each of the sets of time series data of each of the parameters after the end data point until the data length of each of the sets of time series data of each of the parameters is equal to a longest data length of the sets of process data. A third one of the steps includes obtaining a plurality of actual measurement values of the workpieces. A fourth one of the steps includes performing a modeling operation. The modeling operation includes classifying the sets of process data and the actual measurement values into a plurality of paired data and at least one unpaired process data. Each of the paired data includes one of the sets of process data and one of the actual measurement values corresponding to the one of the sets of process data. In addition, the modeling operation further includes creating at least one pre-trained model by using the at least one unpaired process data, and then inputting the paired data to the at least one pre-trained model to create a virtual metrology model based on convolutional autoencoder. The virtual metrology model based on convolutional autoencoder includes at least one convolutional neural network mode. A fifth one of the steps includes performing a calculating operation. The calculating operation includes obtaining at least one of another set of process data and another actual measurement value of another workpiece, and executing one of a predicting step and a transfer learning step according to whether the another actual measurement value is obtained, thereby calculating one of a phase-one virtual metrology value and a phase-two virtual metrology value of the another workpiece. The predicting step includes calculating the phase-one virtual metrology value by the another set of process data according to the virtual metrology model based on convolutional autoencoder. The transfer learning step includes calculating the phase-two virtual metrology value of the another workpiece by the another set of process data and the another actual measurement value according to the virtual metrology model based on convolutional autoencoder.

Therefore, the virtual metrology method based on convolutional autoencoder and transfer learning of the present disclosure integrates convolutional autoencoder with transfer learning to perform the modeling and prediction, and performs effective initial-model-creation approach with insufficient metrology data, thereby solving a problem of a conventional deep learning-based algorithm that needs to collect large amounts of paired data for modeling. In addition, the present disclosure can build a dual-phase scheme based on transfer learning via different learning strategies and have intelligent self-learning capability for on-line model refreshing to maintain the prediction accuracy.

In some embodiments, in the calculating operation, in response to determining that the another actual measurement value is not obtained, performing the predicting step to calculate the phase-one virtual metrology value of the another workpiece. In response to determining that the another actual measurement value is obtained, performing the transfer learning step to calculate the phase-two virtual metrology value of the another workpiece.

In some embodiments, the predicting step further includes after performing the data alignment operation onto the another set of process data of the another workpiece, inputting the another set of process data of the another workpiece into the virtual metrology model based on convolutional autoencoder, thereby calculating the phase-one virtual metrology value of the another workpiece.

In some embodiments, the transfer learning step further includes performing a strategy selection confirming step on the another actual measurement value of the another workpiece to generate a confirmation result, and performing one of a first strategy step and a second strategy step according to the confirmation result to update the virtual metrology model based on convolutional autoencoder. In addition, the transfer learning step further includes inputting the another set of process data of the another workpiece into the virtual metrology model based on convolutional autoencoder, thereby calculating the phase-two virtual metrology value of the another workpiece.

In some embodiments, the strategy selection confirming step includes confirming whether or not a component of the production tool is maintained or replaced. In response to determining that the confirmation result is that the component of the production tool is maintained or replaced, the transfer learning step performs the first strategy step. In response to determining that the confirmation result is that the component of the production tool is not maintained or replaced, the transfer learning step performs the second strategy step.

In some embodiments, in the modeling operation, a number of the at least one convolutional neural network model is plural. The virtual metrology model based on convolutional autoencoder includes the convolutional neural network models and a conjecture model. The convolutional neural network models include a plurality of inputs and a plurality of outputs. The inputs of the convolutional neural network models are the paired data, respectively, and the outputs of the convolutional neural network models are inputs of the conjecture model.

In some embodiments, in the transfer learning step, the first strategy step includes inputting a plurality of sets of time series data of a plurality of parameters of the another set of process data and the another actual measurement value of the another workpiece into the convolutional neural network models. The first strategy step further includes inputting the outputs of the convolutional neural network models into the conjecture model to update the virtual metrology model based on convolutional autoencoder.

In some embodiments, in the transfer learning step, the second strategy step includes inputting the outputs of the convolutional neural network models into the conjecture model to update a part of the virtual metrology model based on convolutional autoencoder.

In some embodiments, the data alignment operation further includes performing a frequency distribution calculation with respect to the data length of each of the sets of time series data of each of the parameters, thereby obtaining a distribution of appearance frequencies versus data lengths. The data length with the largest appearance frequency in the sets of time series data of each of the parameters is a reference data length. Then, a mean calculation is performed on the sets of time series data with the reference data length in the sets of time series data of each of the parameters, thereby obtaining a set of reference time series data of each of the parameters. Thereafter, a distance between each of the sets of time series data of each of the parameters and its corresponding reference time series data is calculated by using a dynamic time warping (DTW) algorithm. Then, a distance threshold is set, and the set of process data corresponding to the distance is deleted when the distance is greater than the distance threshold.

In some embodiments, the production tool is corresponding to each of the phase-one virtual metrology value generated in the predicting step and the phase-two virtual metrology value generated in the transfer learning step, and the production tool adopts a dry etching shallow trench isolation (Dry Etching STI) process of semiconductor manufacturing for critical dimension (CD).

According to another aspect of the present disclosure, a virtual metrology system based on convolutional autoencoder and transfer learning includes a memory and a processor. The memory is configured to store a plurality of sets of process data and a plurality of actual measurement values. The sets of process data are used or generated by a production tool when a plurality of workpieces are processed by the production tool, and the sets of process data are one-to-one corresponding to the workpieces. Each of the sets of process data includes values of a plurality of parameters. The values of each of the parameters are respectively corresponding to a plurality of sets of time series data of the workpieces, and each of the sets of time series data has a data length. The processor is electrically connected to the memory. The processor receives the sets of process data and the actual measurement values, and is configured to perform a data alignment operation, a modeling operation and a calculating operation. The data alignment operation is performed onto the sets of process data. The data alignment operation includes performing a data-length adjusting operation to repeat adding at least one data point having a value of an end data point of each of the sets of time series data of each of the parameters after the end data point until the data length of each of the sets of time series data of each of the parameters is equal to a longest data length of the sets of process data. In the modeling operation, the sets of process data and the actual measurement values are classified into a plurality of paired data and at least one unpaired process data. Each of the paired data includes one of the sets of process data and one of the actual measurement values corresponding to the one of the sets of process data. Thereafter, at least one pre-trained model is created by using the at least one unpaired process data, and then the paired data are inputted to the at least one pre-trained model to create a virtual metrology model based on convolutional autoencoder. The virtual metrology model based on convolutional autoencoder includes at least one convolutional neural network model. The calculating operation includes obtaining at least one of another set of process data and another actual measurement value of another workpiece, and executing one of a predicting step and a transfer learning step according to whether the another actual measurement value is obtained, thereby calculating one of a phase-one virtual metrology value and a phase-two virtual metrology value of the another workpiece. The predicting step includes calculating the phase-one virtual metrology value by the another set of process data according to the virtual metrology model based on convolutional autoencoder, and the transfer learning step includes calculating the phase-two virtual metrology value of the another workpiece by the another set of process data and the another actual measurement value according to the virtual metrology model based on convolutional autoencoder.

Therefore, the virtual metrology system based on convolutional autoencoder and transfer learning of the present disclosure integrates convolutional autoencoder with transfer learning to perform the modeling and prediction, and performs effective initial-model-creation approach with insufficient metrology data, thereby solving a problem of a conventional deep learning-based algorithm that needs to collect large amounts of paired data for modeling. In addition, the present disclosure can build a dual-phase scheme based on transfer learning via different learning strategies and have intelligent self-learning capability for on-line model refreshing to maintain the prediction accuracy.

In some embodiments, in the calculating operation, in response to determining that the another actual measurement value is not obtained, performing the predicting step to calculate the phase-one virtual metrology value of the another workpiece. In response to determining that the another actual measurement value is obtained, performing the transfer learning step to calculate the phase-two virtual metrology value of the another workpiece.

In some embodiments, the predicting step further includes after performing the data alignment operation onto the another set of process data of the another workpiece, inputting the another set of process data of the another workpiece into the virtual metrology model based on convolutional autoencoder, thereby calculating the phase-one virtual metrology value of the another workpiece.

In some embodiments, the transfer learning step further includes performing a strategy selection confirming step on the another actual measurement value of the another workpiece to generate a confirmation result, and performing one of a first strategy step and a second strategy step according to the confirmation result to update the virtual metrology model based on convolutional autoencoder. In addition, the transfer learning step further includes inputting the another set of process data of the another workpiece into the virtual metrology model based on convolutional autoencoder, thereby calculating the phase-two virtual metrology value of the another workpiece.

In some embodiments, the strategy selection confirming step includes confirming whether or not a component of the production tool is maintained or replaced. In response to determining that the confirmation result is that the component of the production tool is maintained or replaced, the transfer learning step performs the first strategy step. In response to determining that the confirmation result is that the component of the production tool is not maintained or replaced, the transfer learning step performs the second strategy step.

In some embodiments, in the modeling operation, a number of the at least one convolutional neural network model is plural. The virtual metrology model based on convolutional autoencoder includes the convolutional neural network models and a conjecture model. The convolutional neural network models include a plurality of inputs and a plurality of outputs. The inputs of the convolutional neural network models are the paired data, respectively, and the outputs of the convolutional neural network models are inputs of the conjecture model.

In some embodiments, in the transfer learning step, the first strategy step includes inputting a plurality of sets of time series data of a plurality of parameters of the another set of process data and the another actual measurement value of the another workpiece into the convolutional neural network models. The first strategy step further includes inputting the outputs of the convolutional neural network models into the conjecture model to update the virtual metrology model based on convolutional autoencoder.

In some embodiments, in the transfer learning step, the second strategy step includes inputting the outputs of the convolutional neural network models into the conjecture model to update a part of the virtual metrology model based on convolutional autoencoder.

In some embodiments, the data alignment operation further includes performing a frequency distribution calculation with respect to the data length of each of the sets of time series data of each of the parameters, thereby obtaining a distribution of appearance frequencies versus data lengths. The data length with the largest appearance frequency in the sets of time series data of each of the parameters is a reference data length. Then, a mean calculation is performed on the sets of time series data with the reference data length in the sets of time series data of each of the parameters, thereby obtaining a set of reference time series data of each of the parameters. Thereafter, a distance between each of the sets of time series data of each of the parameters and its corresponding reference time series data is calculated by using a dynamic time warping (DTW) algorithm. Then, a distance threshold is set, and the set of process data corresponding to the distance is deleted when the distance is greater than the distance threshold.

In some embodiments, the production tool is corresponding to each of the phase-one virtual metrology value generated in the predicting step and the phase-two virtual metrology value generated in the transfer learning step, and the production tool adopts a dry etching shallow trench isolation (Dry Etching STI) process of semiconductor manufacturing for critical dimension (CD).

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device, module) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
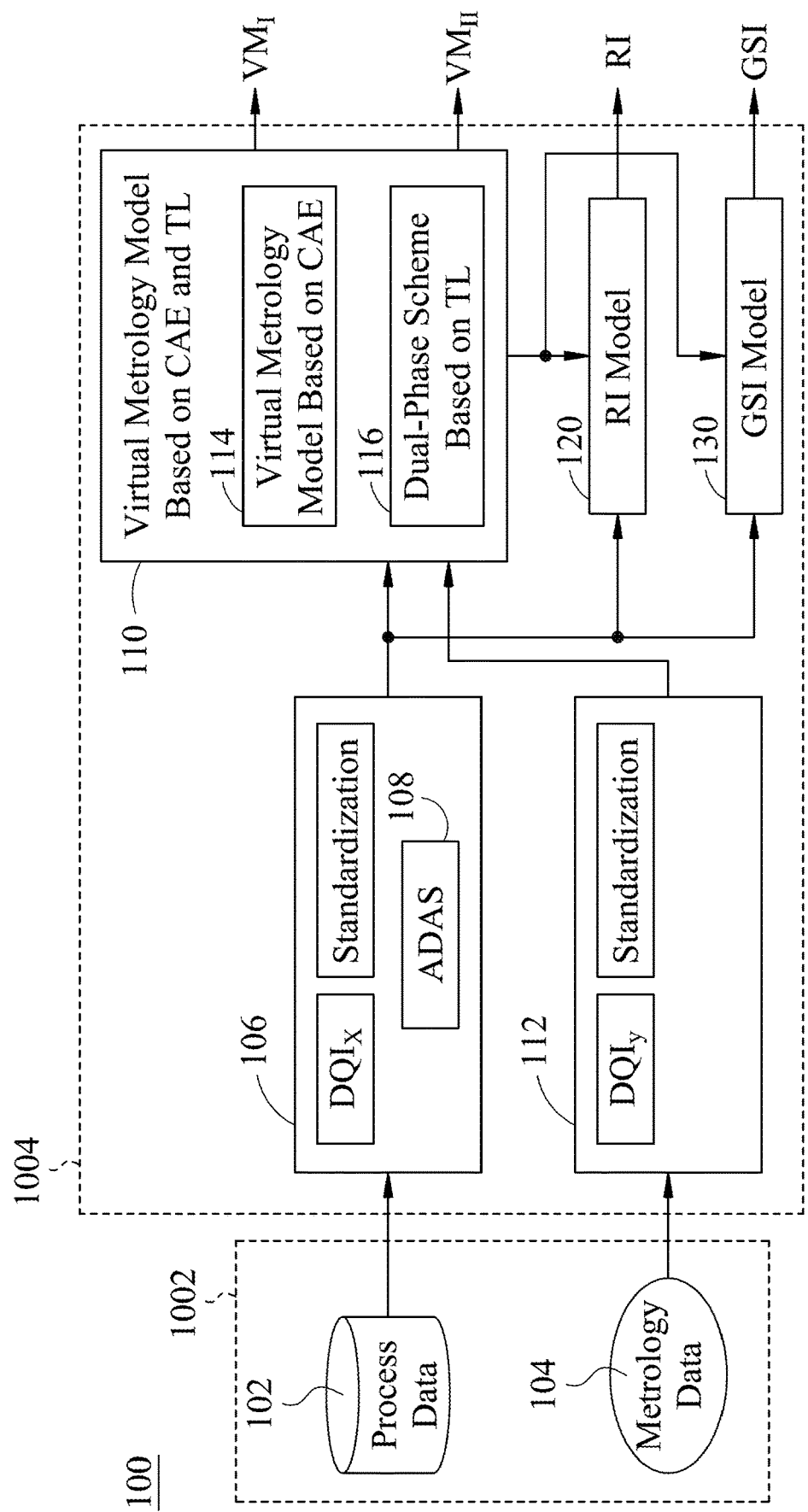
FIG. 1 is schematic block diagram for explaining a virtual metrology system based on convolutional autoencoder and transfer learning according to a first embodiment of the present disclosure.
Figure 2:
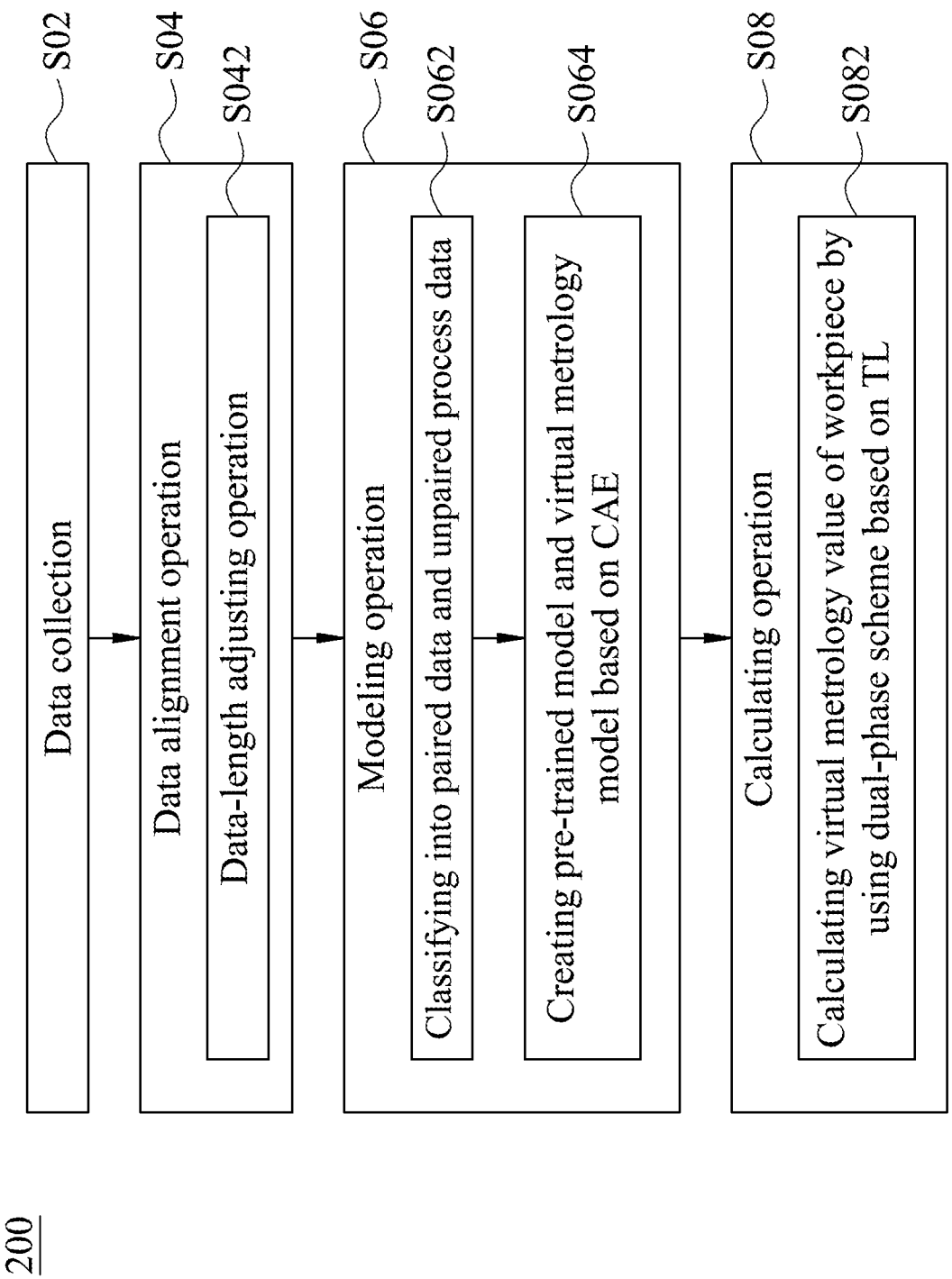
FIG. 2 is a flow chart showing a virtual metrology method based on convolutional autoencoder and transfer learning according to a second embodiment of the present disclosure.

Referring to FIGS. 1 and 2, FIG. 1 is schematic block diagram for explaining a virtual metrology system 100 based on convolutional autoencoder (CAE) and transfer learning (TL) according to a first embodiment of the present disclosure; and FIG. 2 is a flow chart showing a virtual metrology method 200 based on CAE and TL according to a second embodiment of the present disclosure. The virtual metrology system 100 based on CAE and TL includes a memory 1002 and a processor 1004.

The memory 1002 is configured to store plural sets of process data 102 and plural metrology data 104 (i.e., plural actual measurement values). The sets of process data 102 are used or generated by a production tool when plural workpieces are processed by the production tool, and the sets of process data 102 are one-to-one corresponding to the workpieces. Each of the sets of process data 102 includes values of plural parameters. The values of each of the parameters are respectively corresponding to plural sets of time series data of the workpieces, and each of the sets of time series data has a data length. In other words, the aforementioned plural sets of process data 102 of historical workpieces are obtained from the production tool. In addition, each of the metrology data 104 (i.e., the actual measurement values) is obtained after one of the quality items of each workpiece is measured by a metrology tool. For a wafer manufacturing process (e.g., semiconductor manufacturing), the production tool is a wafer processing tool, such as an etch tool, a deposition tool, or a sputter tool, etc.; the actual measurement value (quality item) is a film thickness, an etch depth, an etched sidewall angle, or a critical dimension (CD), etc.; the process data 102 include temperatures. For a wafer sawing process, the production tool is a wafer cutting tool; the actual measurement value (quality item) is a wafer-chipping amount; and the process data 102 include blade clogging, a coolant flow rate, a spindle speed (RPM), a feeding rate, wafer conditions (such as thickness, coating, etc.), and/or a kerf width. For the tool processing, the production tool is a machine tool; the actual measurement value(s) (quality item(s)) include(s) roughness, straightness, angularity, perpendicularity, parallelism and/or roundness; and the process data 102 include a working current, and/or vibration data and/or audio frequency data obtained by three-axis accelerometer sensors or acoustic sensors mounted on the machine tool.

The processor 1004 is electrically connected to the memory 1002. The processor 1004 receives the sets of process data 102 and the metrology data 104 (i.e., the actual measurement values), and is configured to perform a virtual metrology method 200 based on CAE and TL. In detail, the processor 1004 includes a process data preprocessing operation 106, a virtual metrology model 110 based on CAE and TL, a metrology data preprocessing operation 112, a reliance index (RI) model 120 and a global similarity index (GSI) model 130. The process data preprocessing operation 106 receives the sets of process data 102. The process data preprocessing operation 106 performs a data alignment operation based on an automated data alignment scheme (ADAS) 108 on the sets of process data 102, thereby deleting the sets of process data 102 of which the temporal distribution profiles are not similar to each other, and enabling the data lengths of the sets of process data 102 to be the same. Before or after the data alignment operation, the process data preprocessing operation 106 may perform data quality evaluation on the sets of process data 102 based on a process data quality index ($DQI_X$) model, and arranges and standardizes (z-score) the original process data 102 from the production tool. The metrology data preprocessing operation 112 performs data quality evaluation on the metrology data 104 (i.e., the aforementioned actual measurement values) of the historical workpieces based on a metrology data quality index ($DQI_y$) model to delete the abnormal values therein, and standardizes the metrology data 104. Then, the metrology data 104 and the aligned process data 102 of the historical workpieces are used as a set of model-building samples for building the virtual metrology model 110 based on CAE and TL, the RI model 120, and the GSI model 130 according to a convolutional neural network algorithm. The virtual metrology model 110 based on CAE and TL includes a virtual metrology model 114 based on CAE and a dual-phase scheme 116 based on TL. After the virtual metrology model 110 based on CAE and TL, the RI model 120, and the GSI model 130 are built, the virtual metrology model 114 based on CAE is generated, and then virtual metrology may be performed on subsequent workpieces according to the dual-phase scheme 116 based on TL. The dual-phase scheme 116 based on TL includes executing a predicting step (Phase-I) and a transfer learning step (Phase-II). In the predicting step (Phase-I), after a set of process data 102 of a workpiece is obtained, the process data preprocessing operation 106 performs the data alignment operation based on the automated data alignment scheme (ADAS) 108 on the set of process data 102 of the workpiece and/or other data preprocesses. Thereafter, the treated process data 102 are inputted into the virtual metrology model 110 based on CAE and TL, the RI model 120, and the GSI model 130, thus calculating a phase-one virtual metrology value ($VM_I$) of the workpiece and its RI value and GSI value. In the transfer learning step (Phase-II), after the workpiece has been processed by the production tool, if a quality item of the workpiece is measured by the metrology tool and its metrology data 104 (i.e., an actual measurement value) is obtained, then the process data 102 and the metrology data 104 of the workpiece can be used to retrain or tune (adjust) the virtual metrology model 110 based on CAE and TL, the RI model 120 and the GSI model 130, thus calculating a phase-two virtual metrology value ($VM_{II}$) of the workpiece and its RI value and GSI value.

The abovementioned RI model 120, the GSI model 130, the $DQI_X$ model and the $DQI_y$ model may refer to U.S. Pat. No. 8,095,484 B2. U.S. Pat. No. 8,095,484 B2 is hereby incorporated by reference. In addition, the memory 1002 may include a random access memory (RAM) or another type of dynamic storage device that may store information and instructions for execution by the processor 1004. The processor 1004 may include any type of processor, microprocessor, or processing logic that may interpret and execute instructions (e.g., a field programmable gate array (FPGA)). The processor 1004 may include a single device (e.g., a single core) and/or a group of devices (e.g., multi-core).

Therefore, the virtual metrology system 100 based on CAE and TL of the present disclosure integrates CAE with TL to perform the modeling and prediction, thereby solving a problem of a conventional deep learning-based algorithm that needs to collect large amounts of paired data for modeling. In addition, the present disclosure can build the dual-phase scheme 116 based on TL via different learning strategies and have intelligent self-learning capability for on-line model refreshing to maintain the prediction accuracy.

In FIG. 2, the virtual metrology method 200 based on CAE and TL includes plural steps S02, S04, S06 and S08. The step S02 includes performing a data collection operation to obtain plural sets of process data 102, in which the sets of process data 102 are used or generated by a production tool when plural workpieces are processed by the production tool, and the sets of process data 102 are one-to-one corresponding to the workpieces. Each of the sets of process data 102 includes values of plural parameters, and the values of each of the parameters are respectively corresponding to plural sets of time series data of the workpieces. Each of the sets of time series data has a data length.

The step S04 includes performing a data alignment operation onto the sets of process data 102. The data alignment operation includes performing a frequency distribution calculation with respect to the data length of each of the sets of time series data of each of the parameters, thereby obtaining a distribution of appearance frequencies versus data lengths. The data length with the largest appearance frequency in the sets of time series data of each of the parameters is a reference data length. Thereafter, an operation of obtaining a set of reference time series data is performed, in which a mean calculation is performed on the sets of time series data with the reference data length in the sets of time series data of each of the parameters, thereby obtaining a set of reference time series data of each of the parameters. After the set of reference time series data of each of the parameters is obtained, an operation of calculating data distances is performed, in which a distance between each of the sets of time series data of each of the parameters and its corresponding reference time series data is calculated by using a dynamic time warping (DTW) algorithm. The DTW calculates the similarity between two sets of time series data by extending and/or shortening the time series, and it is widely adopted for speech recognition and language recognition to distinguish whether two sets of voice data represents the same word. Thereafter, an operation of setting a distance threshold is performed. When the distance (data distance) between a set of time series data of a parameter of a workpiece and its corresponding reference time series data is greater than the distance threshold, an operation of deleting the set of (historical) process data 102 (time series data) corresponding to the distance is performed, i.e., the set of process data 102 is not similar to other set of process data 102, and is not suitable for model building. Next, an operation of setting an upper limit of data length is performed. Thereafter, a step S042 is performed and includes performing a data-length adjusting operation to repeat adding at least one data point having a value of an end data point of each of the sets of time series data of each of the parameters after the end data point until the data length of each of the sets of time series data of each of the parameters is equal to a longest data length of the sets of process data 102.

After the data-length adjusting operation (i.e., the step S042) is performed, plural metrology data 104 (i.e., plural actual measurement values) of the workpieces are obtained, and then the step S06 is performed. The step S06 includes performing a modeling operation, and the modeling operation includes performing steps S062 and S064. The step S062 includes classifying the sets of process data 102 and the actual measurement values into plural paired data and at least one unpaired process data, in which each of the paired data includes one of the sets of process data 102 and one of the actual measurement values corresponding to the one of the sets of process data 102. The step S064 includes creating at least one pre-trained model by using the at least one unpaired process data, and then inputting the paired data to the at least one pre-trained model to create a virtual metrology model 114 based on CAE. The virtual metrology model 114 based on CAE includes at least one convolutional neural network model.

The step S08 includes performing a calculating operation, and the calculating operation includes performing a step S082. The step S082 includes obtaining at least one of another set of process data and another actual measurement value of another workpiece, and executing one of a predicting step (Phase-I) and a transfer learning step (Phase-II) according to whether the another actual measurement value is obtained, thereby calculating one of a phase-one virtual metrology value ($VM_I$) and a phase-two virtual metrology value ($VM_{II}$) of the another workpiece. The predicting step (Phase-I) includes calculating the phase-one virtual metrology value ($VM_I$) by the another set of process data 102 according to the virtual metrology model 114 based on CAE, and the transfer learning step (Phase-II) includes calculating the phase-two virtual metrology value ($VM_{II}$) of the another workpiece by the another set of process data 102 and the another actual measurement value according to the virtual metrology model 114 based on CAE. The dual-phase scheme 116 based on TL of the present disclosure is realized by the predicting step (Phase-I) and the transfer learning step (Phase-II). The detail of the modeling operation of the step S06 and the calculating operation of the step S08 is described as follows.

Figure 3:
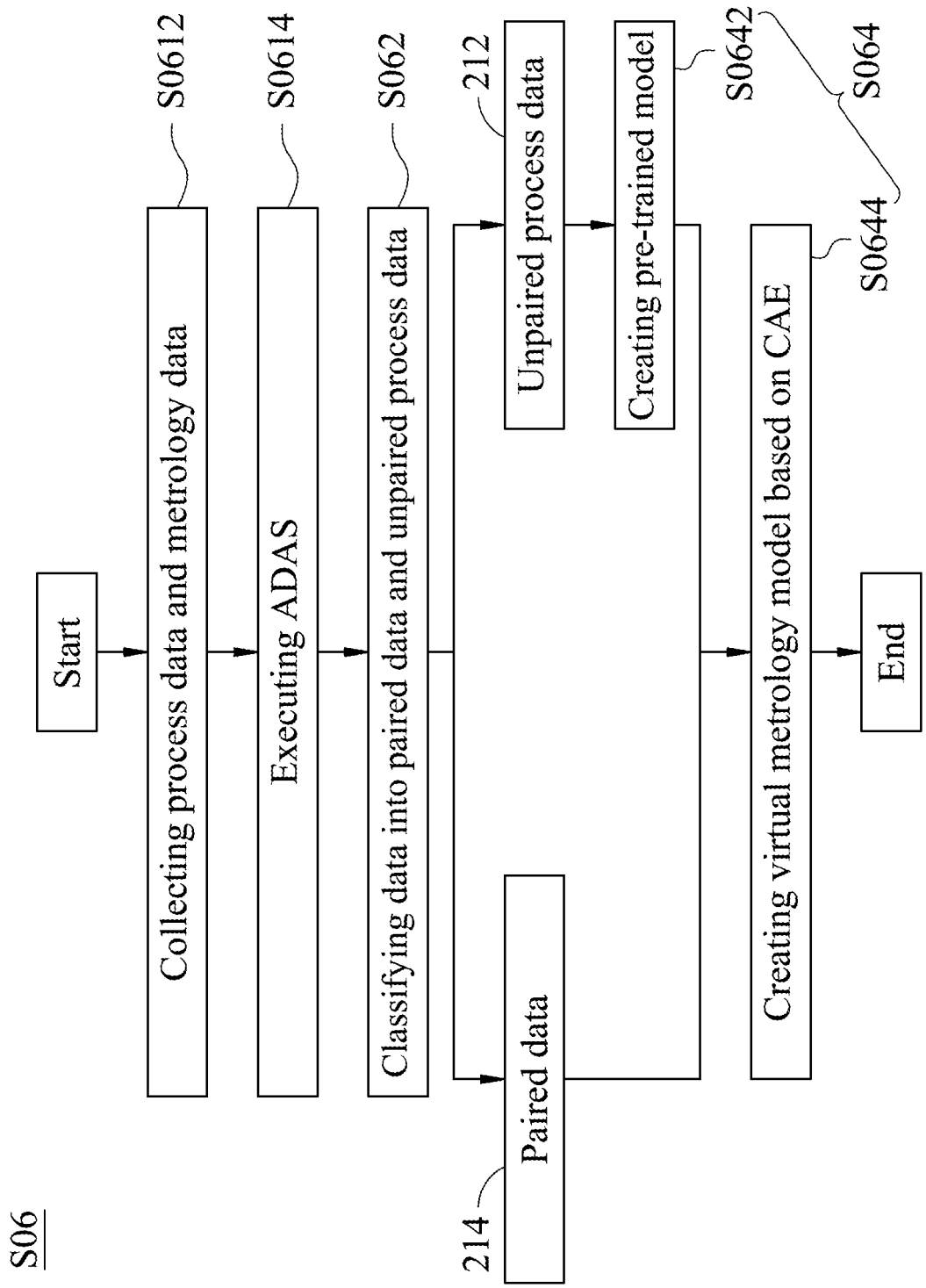
FIG. 3 is a flow chart showing a modeling operation based on convolutional autoencoder of FIG. 2.
Figure 4:
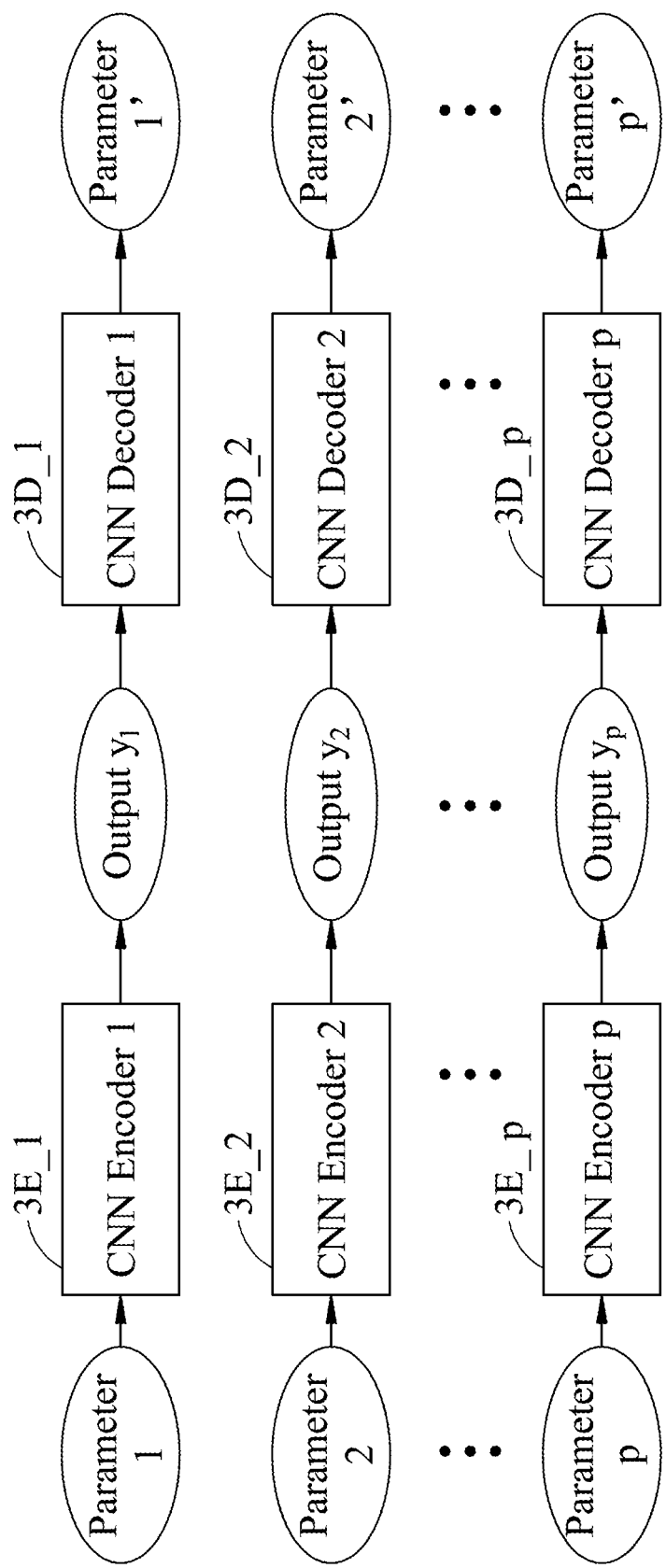
FIG. 4 is schematic diagram showing networks of convolutional autoencoder of FIG. 3.

Referring to FIGS. 1, 2 and 3, FIG. 3 is a flow chart showing a modeling operation (the step S06) based on CAE of FIG. 2. The step S06 includes performing steps S0612, S0614, S062 and S064 in sequence. The step S0612 includes collecting plural sets of process data 102 of the historical workpieces and the metrology data 104 (i.e., the actual measurement values). The step S0614 includes performing a data alignment operation based on an automated data alignment scheme (ADAS) 108 on the sets of process data 102, thereby deleting the sets of process data 102 of which the temporal distribution profiles are not similar to each other, and enabling the data lengths of the sets of process data 102 to be the same. The step S062 includes classifying the sets of process data 102 and the actual measurement values into plural paired data 214 and at least one unpaired process data 212, in which each of the paired data 214 includes one of the sets of process data 102 and one of the actual measurement values corresponding to the one of the sets of process data 102. The step S064 includes performing steps S0642 and S0644 in sequence. The step S0642 includes creating at least one pre-trained model by using the at least one unpaired process data 212. The step S0644 includes inputting the paired data 214 to the at least one pre-trained model to create a virtual metrology model 114 based on CAE. The virtual metrology model 114 based on CAE includes at least one convolutional neural network (CNN) model.

Figure 5:
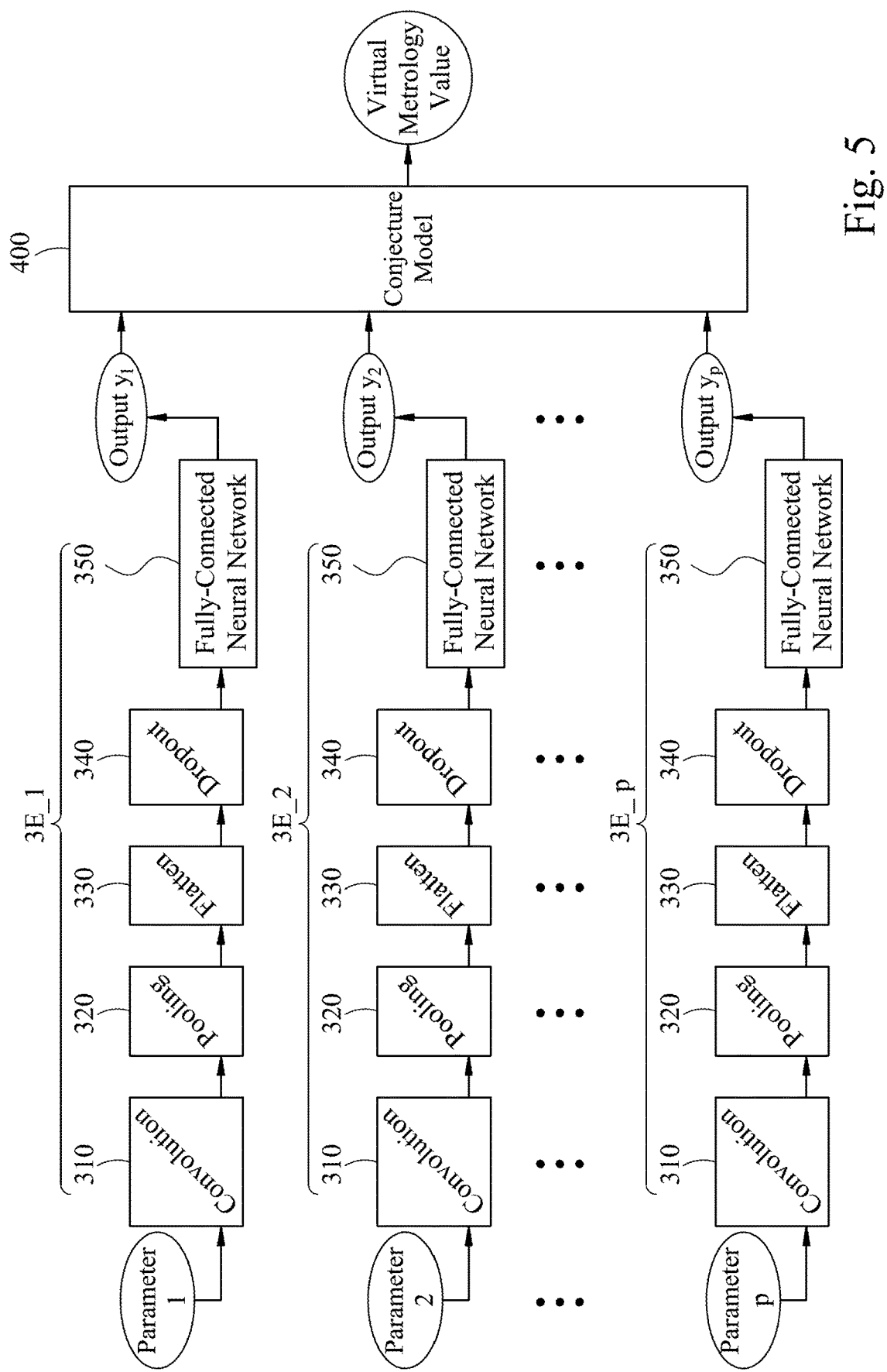
FIG. 5 is schematic diagram showing a virtual metrology model based on convolutional autoencoder of FIG. 3.
Figure 6:
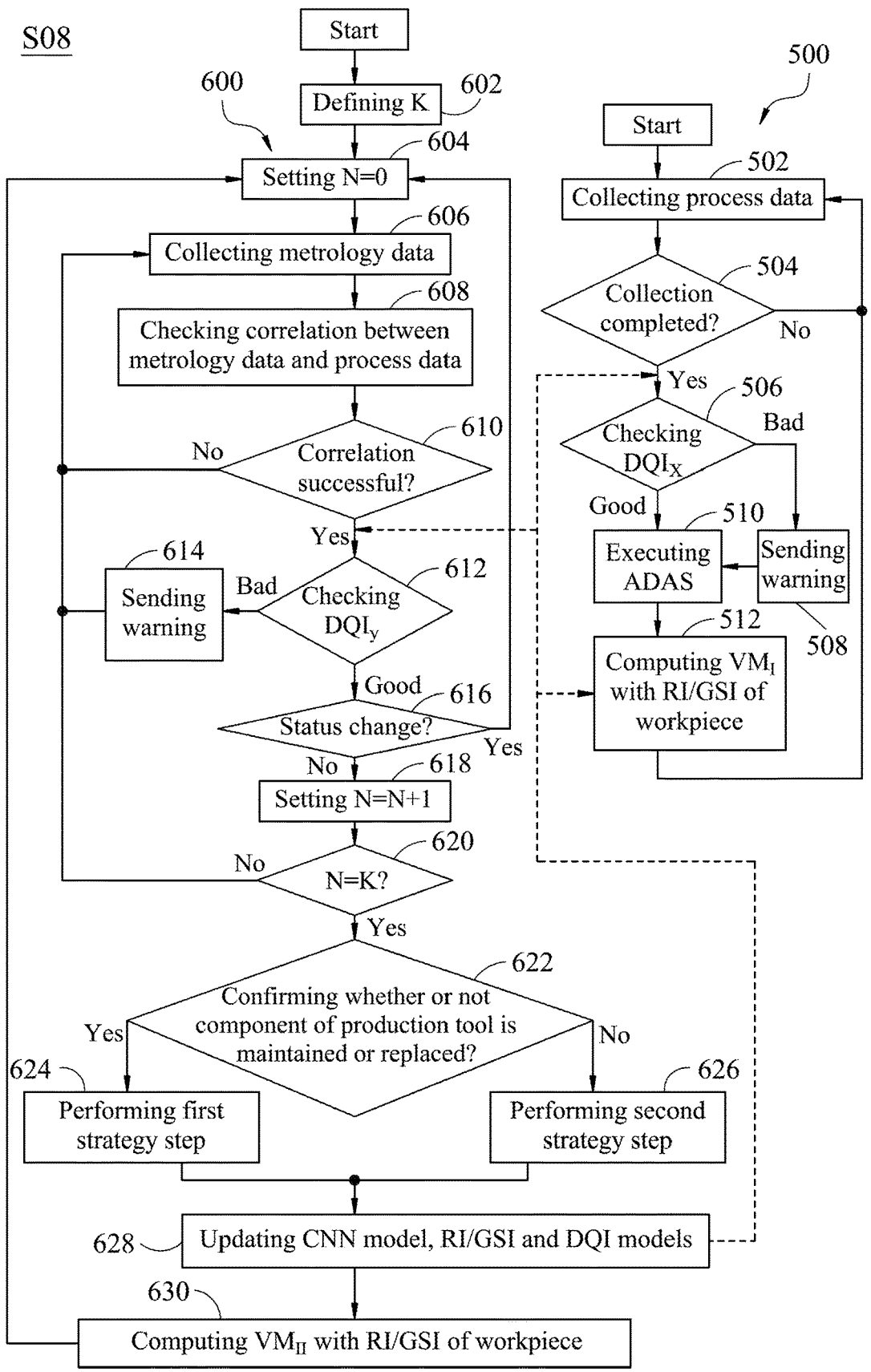
FIG. 6 is a flow chart showing a calculating operation of a dual-phase scheme based on transfer learning of FIG. 2.

Referring to FIGS. 1, 2, 3, 4 and 5, FIG. 4 is schematic diagram showing networks of CAE of FIG. 3; and FIG. 5 is schematic diagram showing a virtual metrology model 114 based on CAE of FIG. 3. In the step S0642, the at least one unpaired process data 212 is used to create the at least one pre-trained model. The at least one pre-trained model is formed by a network of CAE. The at least one pre-trained model includes plural CNN encoders 3E_1, 3E_2 and 3E_p, and plural CNN decoders 3D_1, 3D_2 and 3D_p. The CNN encoders 3E_1, 3E_2 and 3E_p receive a parameter 1, a parameter 2 and a parameter p, respectively. The CNN encoders 3E_1, 3E_2 and 3E_p generate an output $y_1$, an output $y_2$ and an output $y_p$, respectively. The CNN decoders 3D_1, 3D_2 and 3D_p receive the output $y_1$, the output $y_2$ and the output $y_p$, respectively. The CNN decoders 3D_1, 3D_2 and 3D_p generate a parameter 1', a parameter 2' and a parameter p', respectively. In addition, the number of the at least one convolutional neural network model is plural. The virtual metrology model 114 based on CAE includes the convolutional neural network models (e.g., the CNN encoders 3E_1, 3E_2 and 3E_p) and a conjecture model 400. The convolutional neural network models include plural inputs (i.e., the parameter 1, the parameter 2, . . . and the parameter p) and plural outputs (i.e., the output $y_1$, the output $y_2$, . . . and the output $y_p$). The inputs of the convolutional neural network models are the paired data 214, respectively, and the outputs of the convolutional neural network models are inputs of the conjecture model 400. The convolutional neural network models typically include a convolutional layer 310, a pooling layer 320, a flatten layer 330, a dropout layer 340 and a fully-connected neural network 350, in which the fully-connected neural network 350 includes at least one hidden layer and an output layer. The conjecture model 400 has the same structure as the fully-connected neural network 350. Since the convolutional neural network model or algorithm is well known to persons of ordinary skill in the art, the details of the convolutional neural network models or algorithm will be described herein.

Figure 7:
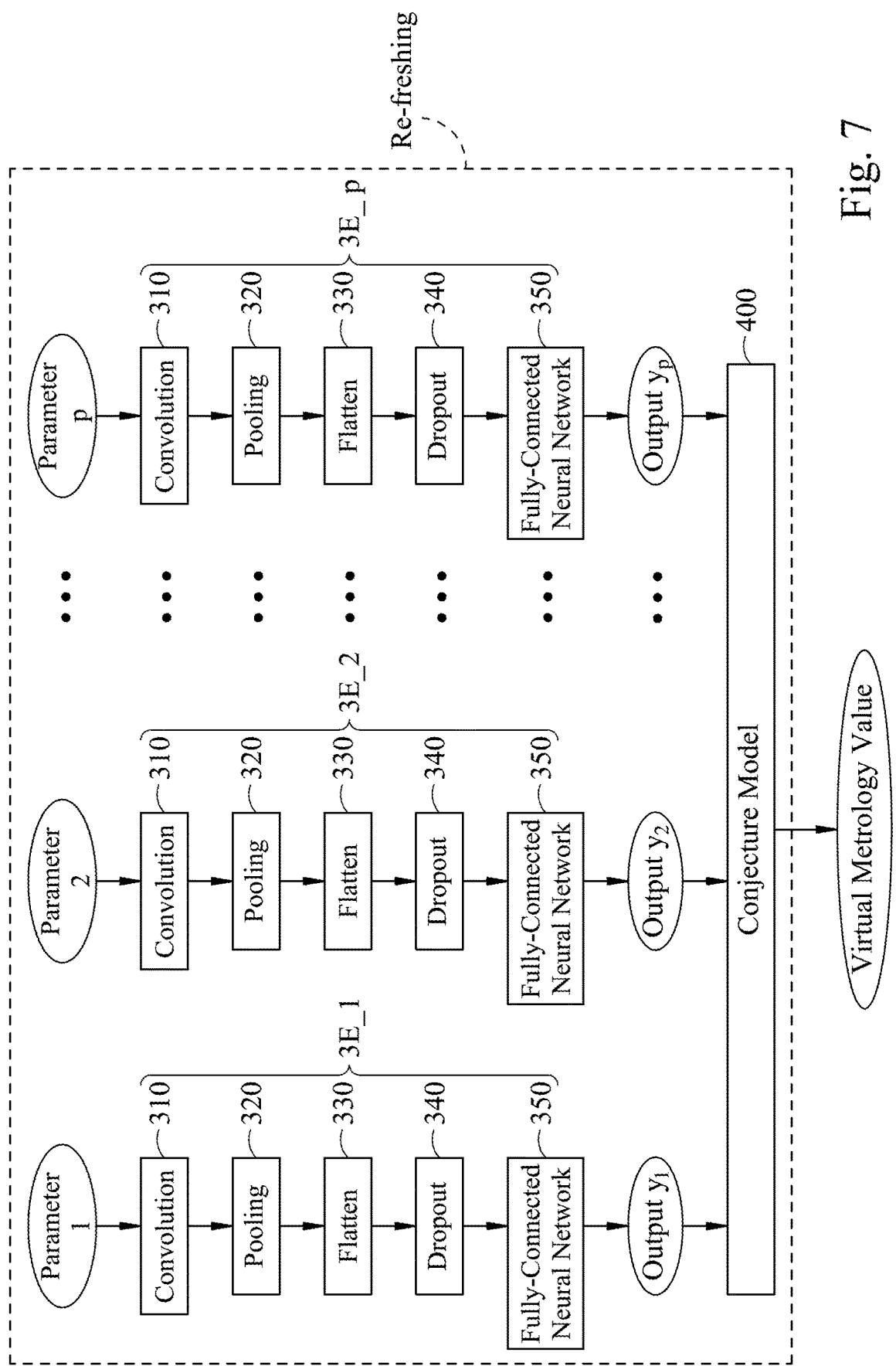
FIG. 7 is schematic diagram showing a first strategy step of FIG. 6.
Figure 8:
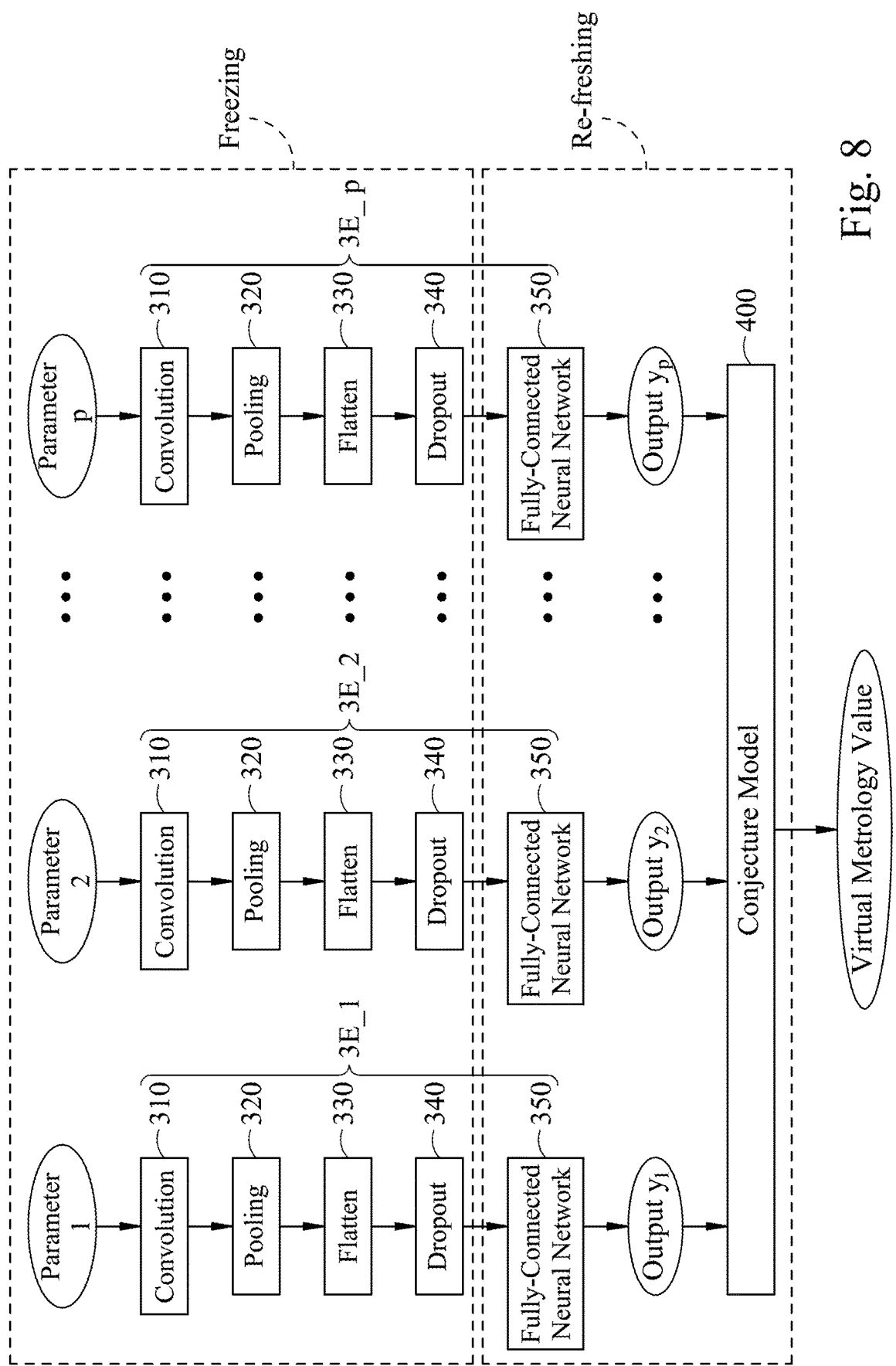
FIG. 8 is schematic diagram showing a second strategy step of FIG. 6.

Referring to FIGS. 1, 2, 3, 4, 5, 6, 7 and 8, FIG. 6 is a flow chart showing a calculating operation (the step S08) of a dual-phase scheme 116 based on TL of FIG. 2; FIG. 7 is schematic diagram showing a first strategy step (Strategy I) of FIG. 6; and FIG. 8 is schematic diagram showing a second strategy step (Strategy II) of FIG. 6. In the calculating operation, in response to determining that the another actual measurement value is not obtained, performing the predicting step 500 to calculate the phase-one virtual metrology value ($VM_I$) of the another workpiece. In contrast, in response to determining that the another actual measurement value is obtained, performing the transfer learning step 600 to calculate the phase-two virtual metrology value ($VM_{II}$) of the another workpiece.

In the predicting step 500, first, a step 502 is performed to collect the process data 102 of a workpiece sent by a process device. Next, a step 504 is performed to check whether the collection of the process data 102 of the workpiece is completed. If the result of the step 504 is no, the step 502 is performed continually. If the result of the step 504 is yes, a step 506 is performed to evaluate the $DQI_X$ of the process data 102. If the result of the step 506 is bad, it represents that the process data 102 is abnormal data, and a warning is sent (a step 508). If the result of the step 506 is good, it represents that the process data 102 is normal data, and a step 510 is performed. The step 510 includes performing a data alignment operation based on an automated data alignment scheme (ADAS) 108 on the sets of process data 102. Finally, a step 512 is performed to input the another set of process data 102 of the another workpiece into the virtual metrology model 114 based on CAE, thereby calculating the phase-one virtual metrology value ($VM_I$) of the another workpiece after performing the data alignment operation onto the another set of process data 102 of the another workpiece.

In the transfer learning step 600, first, a step 602 is performed to define a predetermined parameter value K. Strategy selection may be periodically confirmed according to predetermined parameter value K (i.e., a strategy selection confirming step 622 is periodically performed), and the predetermined parameter value K is a positive integer. Next, a step 604 is performed to set an initial value of a count parameter value N to 0, and the count parameter value N is an integer. Then, a step 606 is performed to collect the actual metrology data 104 of a certain workpiece. Next, a step 608 is performed to check whether the process data 102 of the certain workpiece corresponding to the actual metrology data 104 exists, i.e., check the correlation between the metrology data 104 and the process data 102. Then, a step 610 is performed to judge whether the correlation check is successful. If the result of the step 610 is no, the step 606 is performed continually. If the result of the step 610 is yes, a step 612 is performed to evaluate the $DQI_y$ to judge whether the actual metrology data 104 is normal. If the result of the step 612 is bad, a warning is sent (a step 614), and the step 606 is performed continually. If the result of the step 612 is good, a step 616 is performed to confirm whether a status of the production tool has changed. If the result of the step 616 is yes (i.e., the status of the production tool has changed), the step 604 is performed. If the result of the step 616 is no (i.e., the status of the production tool has not changed), a step 618 is performed to set N=N+1. Next, a step 620 is performed to confirm whether the count parameter value N is equal to the predetermined parameter value K. If the result of the step 620 is no, the step 606 is performed continually. If the result of the step 620 is yes, a strategy selection confirming step 622 is performed on the another actual measurement value of the another workpiece to generate a confirmation result, and one of a first strategy step 624 and a second strategy step 626 is performed according to the confirmation result to update the virtual metrology model 114 based on CAE. The strategy selection confirming step 622 includes confirming whether or not a component of the production tool is maintained or replaced. In response to determining that the confirmation result is that the component of the production tool is maintained or replaced, the first strategy step 624 is performed. In contrast, in response to determining that the confirmation result is that the component of the production tool is not maintained or replaced, the second strategy step 626 is performed.

The first strategy step 624 includes inputting a plurality of sets of time series data of a plurality of parameters of the another set of process data 102 and the another actual measurement value of the another workpiece into the convolutional neural network models; and inputting the outputs of the convolutional neural network models into the conjecture model 400 to update the virtual metrology model 114 based on CAE. In other words, the convolutional neural network models and the conjecture model 400 are re-freshed (Re-freshing). In addition, the first strategy step 624 further includes retraining the RI model, the GSI model, the $DQI_X$ model and the $DQI_y$ model. "Retraining" represents retraining each of the models using updated historical process data 102 and historical metrology values.

The second strategy step 626 includes inputting the outputs of the convolutional neural network models into the conjecture model 400 to update a part of the virtual metrology model 114 based on CAE. In other words, the convolutional neural network models is frozen (Freezing) and not re-freshed, and only the conjecture model 400 is re-freshed. In addition, the second strategy step 626 further includes tuning (adjusting) the RI model, the GSI model, the $DQI_X$ model and the $DQI_y$ model. Before performing a retraining step or a tuning step, an oldest one of the historical process data 102 and the historical metrology values is replaced by a latest one of the sets of process data 102 and the actual measurement values obtained at present. "Tuning" represents adjusting weighting value or parameter value of each of the models using the updated historical process data 102 and the historical metrology values. The execution time of the first strategy step 624 is less than the execution time of the second strategy step 626.

After performing one of the first strategy step 624 and the second strategy step 626, a step 628 of updating the model is performed to replace the original virtual metrology models with the tuned or retrained virtual metrology models. The tuned or retrained virtual metrology models includes the CNN model, the RI model, the GSI model, the $DQI_X$ model and the $DQI_y$ model. The tuned or retrained virtual metrology models are also provided to the steps 506, 512 and 612 to evaluate the quality ($DQI_X$) of the process data 102 of a next workpiece, calculate the phase-one virtual metrology value ($VM_I$) of the next workpiece and its RI value and GSI value, and evaluate the quality ($DQI_y$) of the actual metrology data 104 of the next workpiece. Finally, a step 630 is performed to input the another set of process data 102 of the another workpiece into the virtual metrology model 114 based on CAE (the updated one), thereby calculating the phase-two virtual metrology value ($VM_{II}$) of the another workpiece.

Therefore, the virtual metrology method 200 based on CAE and TL of the present disclosure integrates CAE with TL to perform the modeling and prediction, and performs effective initial-model-creation approach with insufficient paired data 214, thereby solving a problem of a conventional deep learning-based algorithm that needs to collect large amounts of paired data 214 for modeling. In addition, the present disclosure can build the dual-phase scheme 116 based on TL via different learning strategies and have intelligent self-learning capability for on-line model refreshing to maintain the prediction accuracy.

Figure 9:
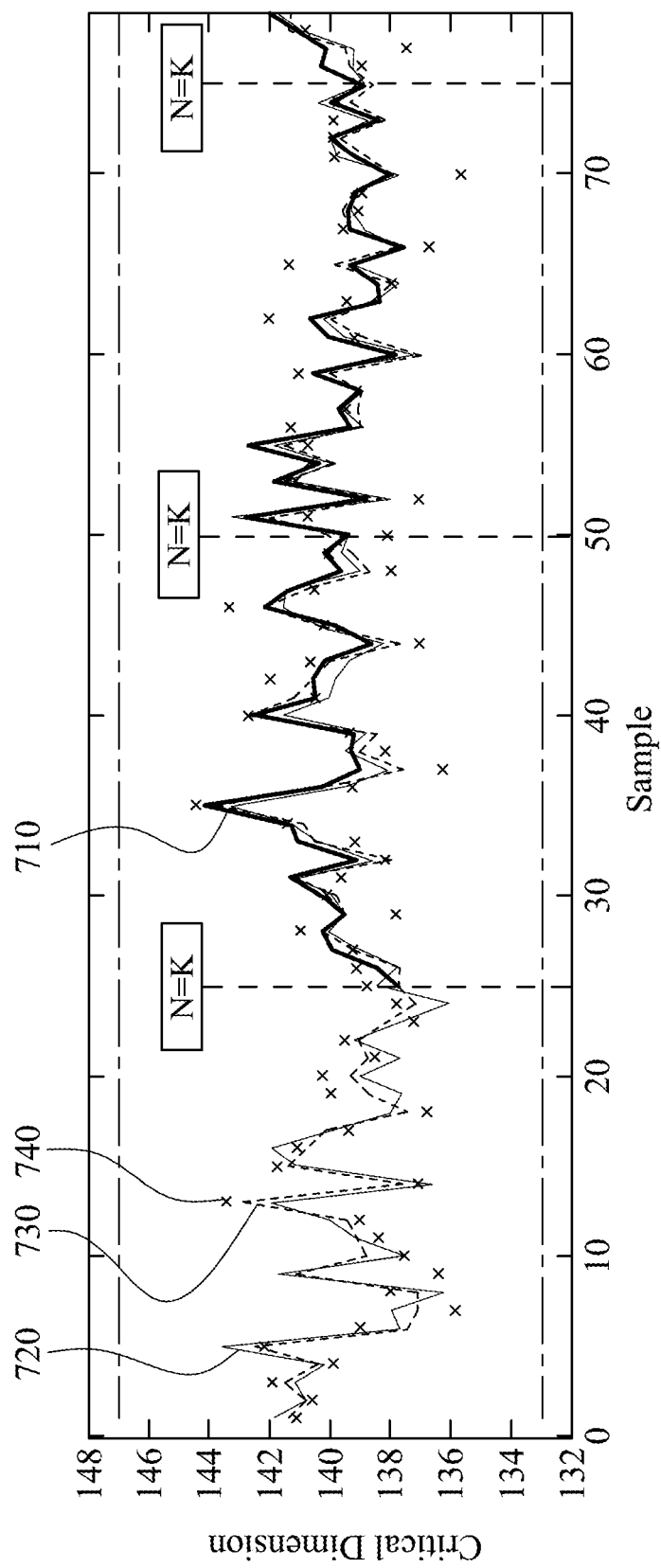
FIG. 9 shows prediction results of the application sample regarding critical dimensions of different strategy combinations.

Referring to FIGS. 1, 2, 3, 6 and 9, FIG. 9 shows prediction results of the application sample regarding critical dimensions (CD) of different strategy combinations. The production tool is corresponding to each of the phase-one virtual metrology value ($VM_I$) generated in the predicting step 500 and the phase-two virtual metrology value ($VM_{II}$) generated in the transfer learning step 600, and the production tool adopts a dry etching shallow trench isolation (Dry Etching STI) process of semiconductor manufacturing for critical dimension (CD). In FIG. 9, the horizontal axis represents the sampling, and the vertical axis represents the critical dimension. The predetermined parameter value K is 25. The number of the paired data 214 for performing the modeling operation (the step S06) is 25, and the number of the unpaired process data 212 is 300. The number of the paired data 214 for performing the calculating operation (the step S08) is 79. A curve 710 represents the prediction result of the critical dimension when using only the first strategy step 624 (always Strategy I). A curve 720 represents the prediction result of the critical dimension when using only the second strategy step 626 (always Strategy II). A curve 730 represents the prediction result of the critical dimension when using the combined strategy of FIG. 6 of the present disclosure. A point group 740 (denoted by "x") represents the actual measurement values. Table 1 lists the prediction accuracies of the critical dimensions of various strategies, and the prediction accuracies are expressed as mean absolute error (MAE). In FIG. 9 and Table 1, the curve 720 (the prediction result of the critical dimension when using only the second strategy step 626) is the worst. The reason is that, the initial model extracts the feature values using CAE algorithm with process data only, thus the correlation between the metrology values and the feature values is not well established. In other words, the model cannot acquire better prediction results if the second strategy step 626 (which freezes the weightings of the convolutional layer) is applied to fine-tune the $AVM_{CNN}$ networks at the step S0644 of FIG. 3. In addition, as for the curve 710 (the prediction result of the critical dimension when using only the first strategy step 624), it adopts the first strategy step 624 for initial modeling by TL and then follows the steps of FIG. 6, in which the second strategy step 626 is not performed (i.e., the model fine-tuning is still conducted with the first strategy step 624) to execute the model fine-tuning. This will deteriorate the prediction accuracy, as the re-freshed model of the convolutional layer and the pooling layer is slightly disturbed by a small amount (K=25) of samples. Finally, the curve 730 of the present disclosure adopts the normal and complete steps of both FIG. 3 and FIG. 6, in which the model can be well established. Thus, as shown in Table 1, the curve 730 of the present disclosure has 6.18% and 15.03% accuracy enhancements compared to the curves 710 and 720, respectively.

TABLE 1

| Prediction Accuracy | Special $AVM_{CNN}$ always Strategy I | Special $AVM_{CNN}$ always Strategy II | Advanced $AVM_{CNN}$ |
|---|---|---|---|
| MAE(Å) | 0.9065 | 0.9820 | 0.8538 |
| MAE Improvement | 6.18% | 15.03% | N/A |

Figure 10:
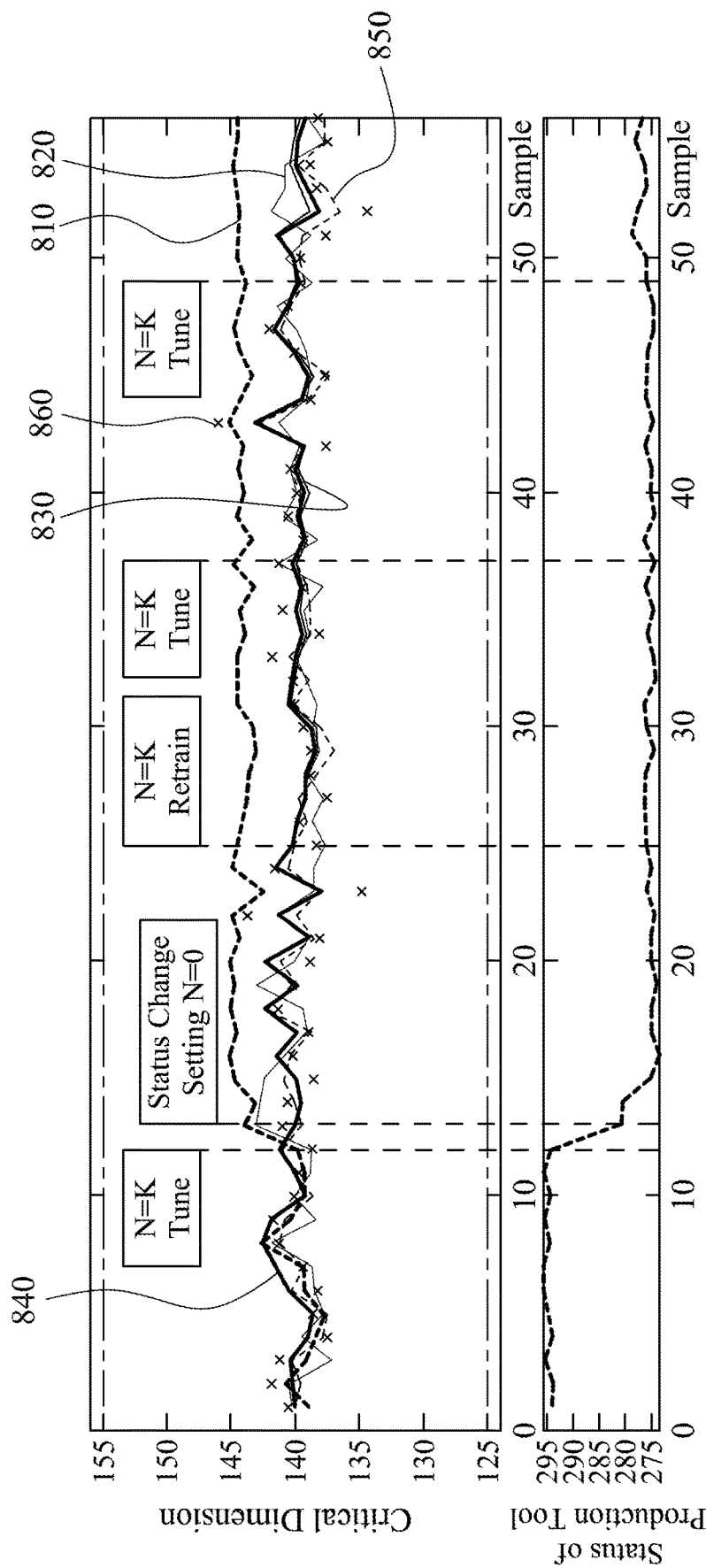
FIG. 10 shows prediction results of the application sample regarding critical dimensions of different prediction algorithms.

Referring to FIGS. 1, 2, 3, 6 and 10, FIG. 10 shows prediction results of the application sample regarding critical dimensions of different prediction algorithms. In FIG. 10, the upper part represents prediction results of the critical dimensions, and the lower part represents a result of the status of the production tool. In the result of the status of the production tool, the horizontal axis represents the sampling, and the vertical axis represents the status of the production tool. The status of the production tool changes at the sample 13. The present disclosure sets N=0 when the status of the production tool changes by using the step 616 of FIG. 6, and the steps 606, 608, 610 and 612 are re-executed. In the prediction results of the critical dimensions, the horizontal axis represents the sampling, and the vertical axis represents the critical dimension. The predetermined parameter value K is 12. The number of the paired data 214 for performing the modeling operation (the step S06) is 25, and the number of the unpaired process data 212 is 275. The number of the paired data 214 for performing the calculating operation (the step S08) is 56. A curve 810 ($AVM_{BPNN}$) represents the prediction result of the automatic virtual metrology (AVM) when using a back propagation neural network (BPNN) algorithm. A curve 820 ($AVM_{BPNN}$ Dual Phase) represents the prediction result of the AVM when using the BPNN algorithm and the dual-phase scheme. A curve 830 (AVM$_{CNN}$) represents the prediction result of the AVM when using a convolutional neural network (CNN) algorithm. A curve 840 (AVM$_{CNN}$ Dual Phase) represents the prediction result of the AVM when using the CNN algorithm and the dual-phase scheme. A curve 850 (AVM$_{CNN}$ (CAE+TL+Dual Phase)) represents the prediction result of the AVM when using the method based on CAE and TL of FIGS. 3 and 6 of the present disclosure. A point group 860 (denoted by "x") represents the actual measurement values. Table 2 lists the prediction accuracies of the critical dimensions of various AVM methods when the status of the production tool changes, and the prediction accuracies are expressed as MAE. In FIG. 10 and Table 2, the curve 850 of the present disclosure has 276.36%, 39.23%, 15.70% and 9.92% accuracy enhancements compared to the curves 810, 820, 830 and 840, respectively.

TABLE 2

| Prediction Accuracy | AVM$_{BPNN}$ | AVM$_{BPNN}$ Dual Phase | AVM$_{CNN}$ | AVM$_{CNN}$ Dual Phase | AVM$_{CNN}$ (CAE + TL + Dual Phase) |
|---|---|---|---|---|---|
| MAE(Å) | 3.9594 | 1.4647 | 1.2172 | 1.1564 | 1.0520 |
| MAE Improvement | 276.36% | 39.23% | 15.70% | 9.92% | N/A |

It is understood that the virtual metrology method based on CAE and TL of the present disclosure is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers, glass substrates). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

According to the aforementioned embodiments and examples, the advantages of the present disclosure are described as follows.

1. The virtual metrology method based on CAE and TL and the system thereof of the present disclosure integrate CAE with TL to perform the modeling and prediction, and perform effective initial-model-creation approach with insufficient paired data, thereby solving a problem of a conventional deep learning-based algorithm that needs to collect large amounts of paired data for modeling.

2. The virtual metrology method based on CAE and TL and the system thereof of the present disclosure can build the dual-phase scheme based on TL via different learning strategies and have intelligent self-learning capability for on-line model refreshing to maintain the prediction accuracy, thus facilitating AVM to have wider application in the more and more sophisticated semiconductor industry.

3. The present disclosure has at least 9.92% accuracy enhancements compared to the conventional AVM algorithms, i.e., the present disclosure has higher prediction accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A virtual metrology method based on convolutional autoencoder and transfer learning, comprising:
obtaining a plurality of sets of process data, wherein the sets of process data are used or generated by a production tool when a plurality of workpieces are processed by the production tool, and the sets of process data are one-to-one corresponding to the workpieces, and each of the sets of process data comprises values of a plurality of parameters, and the values of each of the parameters are respectively corresponding to a plurality of sets of time series data of the workpieces, and each of the sets of time series data has a data length;
performing a data alignment operation onto the sets of process data, the data alignment operation comprising:
performing a data-length adjusting operation to repeat adding at least one data point having a value of an end data point of each of the sets of time series data of each of the parameters after the end data point until the data length of each of the sets of time series data of each of the parameters is equal to a longest data length of the sets of process data;

obtaining a plurality of actual measurement values of the workpieces;

performing a modeling operation, the modeling operation comprising:

classifying the sets of process data and the actual measurement values into a plurality of paired data and at least one unpaired process data, wherein each of the paired data comprises one of the sets of process data and one of the actual measurement values corresponding to the one of the sets of process data; and creating at least one pre-trained model by using the at least one unpaired process data, and then inputting the paired data to the at least one pre-trained model to create a virtual metrology model based on convolutional autoencoder, wherein the virtual metrology model based on convolutional autoencoder comprises at least one convolutional neural network model; and performing a calculating operation, the calculating operation comprising:

obtaining at least one of another set of process data and another actual measurement value of another workpiece, and executing one of a predicting step and a transfer learning step according to whether the another actual measurement value is obtained, thereby calculating one of a phase-one virtual metrology value and a phase-two virtual metrology value of the another workpiece;

wherein the predicting step comprises calculating the phase-one virtual metrology value by the another set of process data according to the virtual metrology model based on convolutional autoencoder, and the transfer learning step comprises calculating the phase-two virtual metrology value of the another workpiece by the another set of process data and the another actual measurement value according to the virtual metrology model based on convolutional autoencoder.

2. The virtual metrology method based on convolutional autoencoder and transfer learning as claimed in claim 1, wherein in the calculating operation, in response to determining that the another actual measurement value is not obtained, performing the predicting step to calculate the phase-one virtual metrology value of the another workpiece; and in response to determining that the another actual measurement value is obtained, performing the transfer learning step to calculate the phase-two virtual metrology value of the another workpiece.

3. The virtual metrology method based on convolutional autoencoder and transfer learning as claimed in claim 2, wherein the predicting step further comprises:

after performing the data alignment operation onto the another set of process data of the another workpiece, inputting the another set of process data of the another workpiece into the virtual metrology model based on convolutional autoencoder, thereby calculating the phase-one virtual metrology value of the another workpiece.

4. The virtual metrology method based on convolutional autoencoder and transfer learning as claimed in claim 2, wherein the transfer learning step further comprises:

performing a strategy selection confirming step on the another actual measurement value of the another workpiece to generate a confirmation result, and performing one of a first strategy step and a second strategy step according to the confirmation result to update the virtual metrology model based on convolutional autoencoder; and inputting the another set of process data of the another workpiece into the virtual metrology model based on convolutional autoencoder, thereby calculating the phase-two virtual metrology value of the another workpiece.

5. The virtual metrology method based on convolutional autoencoder and transfer learning as claimed in claim 4, wherein the strategy selection confirming step comprises:

confirming whether or not a component of the production tool is maintained or replaced;

wherein in response to determining that the confirmation result is that the component of the production tool is maintained or replaced, the transfer learning step performs the first strategy step;

wherein in response to determining that the confirmation result is that the component of the production tool is not maintained or replaced, the transfer learning step performs the second strategy step.

6. The virtual metrology method based on convolutional autoencoder and transfer learning as claimed in claim 4, wherein in the modeling operation, a number of the at least one convolutional neural network model is plural, the virtual metrology model based on convolutional autoencoder comprises the convolutional neural network models and a conjecture model, the convolutional neural network models comprise a plurality of inputs and a plurality of outputs, the inputs of the convolutional neural network models are the paired data, respectively, and the outputs of the convolutional neural network models are inputs of the conjecture model.

7. The virtual metrology method based on convolutional autoencoder and transfer learning as claimed in claim 6, wherein in the transfer learning step, the first strategy step comprises:

inputting a plurality of sets of time series data of a plurality of parameters of the another set of process data and the another actual measurement value of the another workpiece into the convolutional neural network models; and inputting the outputs of the convolutional neural network models into the conjecture model to update the virtual metrology model based on convolutional autoencoder.

8. The virtual metrology method based on convolutional autoencoder and transfer learning as claimed in claim 6, wherein in the transfer learning step, the second strategy step comprises:

inputting the outputs of the convolutional neural network models into the conjecture model to update a part of the virtual metrology model based on convolutional autoencoder.

9. The virtual metrology method based on convolutional autoencoder and transfer learning as claimed in claim 1, wherein the data alignment operation further comprises:

performing a frequency distribution calculation with respect to the data length of each of the sets of time series data of each of the parameters, thereby obtaining a distribution of appearance frequencies versus data lengths, wherein the data length with the largest appearance frequency in the sets of time series data of each of the parameters is a reference data length;

performing a mean calculation on the sets of time series data with the reference data length in the sets of time series data of each of the parameters, thereby obtaining a set of reference time series data of each of the parameters;

calculating a distance between each of the sets of time series data of each of the parameters and its corresponding reference time series data by using a dynamic time warping (DTW) algorithm;

setting a distance threshold; and deleting the set of process data corresponding to the distance when the distance is greater than the distance threshold.

10. The virtual metrology method based on convolutional autoencoder and transfer learning as claimed in claim 1, wherein the production tool is corresponding to each of the phase-one virtual metrology value generated in the predicting step and the phase-two virtual metrology value generated in the transfer learning step, and the production tool adopts a dry etching shallow trench isolation (Dry Etching STI) process of semiconductor manufacturing for critical dimension (CD).

11. A virtual metrology system based on convolutional autoencoder and transfer learning, comprising:

a memory configured to store a plurality of sets of process data and a plurality of actual measurement values, wherein the sets of process data are used or generated by a production tool when a plurality of workpieces are processed by the production tool, and the sets of process data are one-to-one corresponding to the workpieces, and each of the sets of process data comprises values of a plurality of parameters, and the values of each of the parameters are respectively corresponding to a plurality of sets of time series data of the workpieces, and each of the sets of time series data has a data length; and a processor electrically connected to the memory, wherein the processor receives the sets of process data and the actual measurement values, and is configured to:

perform a data alignment operation onto the sets of process data, the data alignment operation comprising:

performing a data-length adjusting operation to repeat adding at least one data point having a value of an end data point of each of the sets of time series data of each of the parameters after the end data point until the data length of each of the sets of time series data of each of the parameters is equal to a longest data length of the sets of process data;

perform a modeling operation, the modeling operation comprising:

classifying the sets of process data and the actual measurement values into a plurality of paired data and at least one unpaired process data, wherein each of the paired data comprises one of the sets of process data and one of the actual measurement values corresponding to the one of the sets of process data; and creating at least one pre-trained model by using the at least one unpaired process data, and then inputting the paired data to the at least one pre-trained model to create a virtual metrology model based on convolutional autoencoder, wherein the virtual metrology model based on convolutional autoencoder comprises at least one convolutional neural network model; and perform a calculating operation, the calculating operation comprising:

obtaining at least one of another set of process data and another actual measurement value of another workpiece, and executing one of a predicting step and a transfer learning step according to whether the another actual measurement value is obtained, thereby calculating one of a phase-one virtual metrology value and a phase-two virtual metrology value of the another workpiece;

wherein the predicting step comprises calculating the phase-one virtual metrology value by the another set of process data according to the virtual metrology model based on convolutional autoencoder, and the transfer learning step comprises calculating the phase-two virtual metrology value of the another workpiece by the another set of process data and the another actual measurement value according to the virtual metrology model based on convolutional autoencoder.

12. The virtual metrology system based on convolutional autoencoder and transfer learning as claimed in claim 11, wherein in the calculating operation, in response to determining that the another actual measurement value is not obtained, performing the predicting step to calculate the phase-one virtual metrology value of the another workpiece; and in response to determining that the another actual measurement value is obtained, performing the transfer learning step to calculate the phase-two virtual metrology value of the another workpiece.

13. The virtual metrology system based on convolutional autoencoder and transfer learning as claimed in claim 12, wherein the predicting step further comprises:

after performing the data alignment operation onto the another set of process data of the another workpiece, inputting the another set of process data of the another workpiece into the virtual metrology model based on convolutional autoencoder, thereby calculating the phase-one virtual metrology value of the another workpiece.

14. The virtual metrology system based on convolutional autoencoder and transfer learning as claimed in claim 12, wherein the transfer learning step further comprises:

performing a strategy selection confirming step on the another actual measurement value of the another workpiece to generate a confirmation result, and performing one of a first strategy step and a second strategy step according to the confirmation result to update the virtual metrology model based on convolutional autoencoder; and inputting the another set of process data of the another workpiece into the virtual metrology model based on convolutional autoencoder, thereby calculating the phase-two virtual metrology value of the another workpiece.

15. The virtual metrology system based on convolutional autoencoder and transfer learning as claimed in claim 14, wherein the strategy selection confirming step comprises:

confirming whether or not a component of the production tool is maintained or replaced;

wherein in response to determining that the confirmation result is that the component of the production tool is maintained or replaced, the transfer learning step performs the first strategy step;

wherein in response to determining that the confirmation result is that the component of the production tool is not maintained or replaced, the transfer learning step performs the second strategy step.

16. The virtual metrology system based on convolutional autoencoder and transfer learning as claimed in claim 14, wherein in the modeling operation, a number of the at least one convolutional neural network model is plural, the virtual metrology model based on convolutional autoencoder comprises the convolutional neural network models and a conjecture model, the convolutional neural network models comprise a plurality of inputs and a plurality of outputs, the inputs of the convolutional neural network models are the paired data, respectively, and the outputs of the convolutional neural network models are inputs of the conjecture model.

17. The virtual metrology system based on convolutional autoencoder and transfer learning as claimed in claim 16, wherein in the transfer learning step, the first strategy step comprises:

inputting a plurality of sets of time series data of a plurality of parameters of the another set of process data and the another actual measurement value of the another workpiece into the convolutional neural network models; and inputting the outputs of the convolutional neural network models into the conjecture model to update the virtual metrology model based on convolutional autoencoder.

18. The virtual metrology system based on convolutional autoencoder and transfer learning as claimed in claim 16, wherein in the transfer learning step, the second strategy step comprises:

inputting the outputs of the convolutional neural network models into the conjecture model to update a part of the virtual metrology model based on convolutional autoencoder.

19. The virtual metrology system based on convolutional autoencoder and transfer learning as claimed in claim 11, wherein the data alignment operation further comprises:

performing a frequency distribution calculation with respect to the data length of each of the sets of time series data of each of the parameters, thereby obtaining a distribution of appearance frequencies versus data lengths, wherein the data length with the largest appearance frequency in the sets of time series data of each of the parameters is a reference data length;

performing a mean calculation on the sets of time series data with the reference data length in the sets of time series data of each of the parameters, thereby obtaining a set of reference time series data of each of the parameters;

calculating a distance between each of the sets of time series data of each of the parameters and its corresponding reference time series data by using a dynamic time warping (DTW) algorithm;

setting a distance threshold; and deleting the set of process data corresponding to the distance when the distance is greater than the distance threshold.

20. The virtual metrology system based on convolutional autoencoder and transfer learning as claimed in claim 11, wherein the production tool is corresponding to each of the phase-one virtual metrology value generated in the predicting step and the phase-two virtual metrology value generated in the transfer learning step, and the production tool adopts a dry etching shallow trench isolation (Dry Etching STI) process of semiconductor manufacturing for critical dimension (CD).

\* \* \* \* \*